United States Patent
Yumii

(10) Patent No.: US 12,090,794 B2
(45) Date of Patent: Sep. 17, 2024

(54) PNEUMATIC TIRE

(71) Applicant: BRIDGESTONE CORPORATION, Tokyo (JP)

(72) Inventor: Keita Yumii, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 304 days.

(21) Appl. No.: 17/756,564

(22) PCT Filed: Jun. 22, 2020

(86) PCT No.: PCT/JP2020/024395
§ 371 (c)(1),
(2) Date: May 27, 2022

(87) PCT Pub. No.: WO2021/111664
PCT Pub. Date: Jun. 10, 2021

(65) Prior Publication Data
US 2022/0410633 A1    Dec. 29, 2022

(30) Foreign Application Priority Data
Dec. 5, 2019   (JP) ................. 2019-220450

(51) Int. Cl.
 B60C 11/12  (2006.01)
 B60C 11/03  (2006.01)

(52) U.S. Cl.
 CPC ...... B60C 11/0323 (2013.01); B60C 11/1204 (2013.01); B60C 11/1236 (2013.01); B60C 11/1281 (2013.01); B60C 2011/1209 (2013.01)

(58) Field of Classification Search
 CPC ............. B60C 11/0323; B60C 11/1281; B60C 11/1222; B60C 11/0332
 See application file for complete search history.

(56) References Cited

U.S. PATENT DOCUMENTS

5,385,189 A * 1/1995 Aoki .............. B60C 1/00
                                          152/DIG. 3
6,443,199 B1 * 9/2002 Scarpitti ......... B60C 19/001
                                          152/209.1
(Continued)

FOREIGN PATENT DOCUMENTS

DE  102010017702 A1 * 1/2012 ......... B60C 11/0323
EP    3521064 A1    8/2019
(Continued)

OTHER PUBLICATIONS

May 17, 2022, International Preliminary Report on Patentability issued in the International Patent Application No. PCT/JP2020/024395.
(Continued)

*Primary Examiner* — Robert C Dye
(74) *Attorney, Agent, or Firm* — KENJA IP LAW PC

(57) ABSTRACT

A pneumatic tire includes circumferential main grooves extending in the tire circumferential direction on the tread surface, and in widthwise outermost land portions, widthwise grooves extending from the tread edges inward in the tire width direction and widthwise sipes extending from the tire widthwise inner edge of the widthwise grooves inward in the tire width direction and connecting to the circumferential main groove. Each widthwise sipe includes a widened portion, by the sipe bottom, with a larger sipe width than at the tread surface. A rectangle ratio is 0.8 or more. Each widthwise sipe extends at a first angle relative to the tire width direction in plan view of the tread surface. In a tire radial region containing the widened portion, the widened portion extends at a second angle smaller than the first angle relative to the tire width direction, or partially extends along the tire width direction.

16 Claims, 5 Drawing Sheets

(56) References Cited

U.S. PATENT DOCUMENTS

| | | | |
|---|---|---|---|
| 6,688,356 | B1 | 2/2004 | Sato |
| 9,061,551 | B2 | 6/2015 | Taniguchi et al. |
| 11,305,590 | B2 | 4/2022 | Ishigaki |
| 2007/0006952 | A1 | 1/2007 | Shima et al. |
| 2011/0220258 | A1* | 9/2011 | Taniguchi ........... B60C 11/1281 |
| | | | 152/209.18 |
| 2017/0120692 | A1 | 5/2017 | Durand-Gasselin et al. |
| 2019/0241022 | A1* | 8/2019 | Ishigaki .............. B60C 11/1218 |
| 2020/0148009 | A1 | 5/2020 | Hayashi |

FOREIGN PATENT DOCUMENTS

| | | |
|---|---|---|
| JP | H115414 A | 1/1999 |
| JP | 2001219718 A | 8/2001 |
| JP | 2002264613 A | 9/2002 |
| JP | 2006347227 A | 12/2006 |
| JP | 2011183952 A | 9/2011 |
| JP | 2014097697 A | 5/2014 |
| JP | 7081185 B2 | 6/2022 |
| WO | 2019021723 A1 | 1/2019 |

OTHER PUBLICATIONS

Sep. 1, 2020, International Search Report issued in the International Patent Application No. PCT/JP2020/024395.

Oct. 12, 2022, search result of the Extended European Search Report issued by the European Patent Office in the corresponding European Patent Application No. 20896817.2.

* cited by examiner

A-A cross-section    B-B cross-section    C-C cross-section

PNEUMATIC TIRE

TECHNICAL FIELD

The present disclosure relates to a pneumatic tire.

BACKGROUND

Widthwise grooves extending in the tire width direction have been provided in the land portion farthest outward in the tire width direction. This configuration can improve the drainage performance of the tire. Widthwise sipes extending in the tire width direction are also sometimes provided in the land portion farthest outward in the tire width direction (for example, patent literature 1) to remove a water film and improve the drainage performance of the tire.

CITATION LIST

Patent Literature

PTL 1: WO 2019/021723 A1

SUMMARY

Technical Problem

However, with the above technology, the groove volume of the widthwise grooves decreases when wear progresses, and the drainage performance may decrease when wear progress. The widthwise sipes might also become a source of pattern noise, preventing the tire from being sufficiently quiet.

The present disclosure aims to provide a pneumatic tire that suppresses the generation of pattern noise and improves the drainage performance when wear progresses.

Solution to Problem

A summary of the present disclosure is as follows.

A pneumatic tire including a plurality of circumferential main grooves extending in a tire circumferential direction on a tread surface; and
  in a widthwise outermost land portion defined by a tread edge and by the circumferential main groove located farthest outward in a tire width direction, a plurality of widthwise grooves extending from the tread edge inward in the tire width direction and a plurality of widthwise sipes extending from a tire widthwise inner edge of the widthwise grooves inward in the tire width direction and connecting to the circumferential main groove, wherein
  each widthwise sipe includes a widened portion, on a sipe bottom side, at which a sipe width is larger than on the tread surface side,
  in a contact patch when the pneumatic tire is mounted on an applicable rim, filled to a prescribed internal pressure, and subjected to a maximum load, a rectangle ratio of a ground contact length LE at a position, in the tire width direction, located 10% of a ground contact width W inward in the tire width direction from a tire widthwise edge to a ground contact length LC at a center of the contact patch in the tire width direction is 0.8 or more,
  each widthwise sipe extends while inclined at a first inclination angle relative to the tire width direction in plan view of the tread surface, and in a tire radial region in which the widened portion is located, the widened portion extends while inclined at a second inclination angle smaller than the first inclination angle relative to the tire width direction, or includes a portion extending along the tire width direction.

Here, the "tread surface" refers to the entire tread surface (contact patch) in the tire circumferential direction that comes into contact with the road surface when the pneumatic tire is mounted on an applicable rim, filled to a prescribed internal pressure, and subjected to the maximum load.

The "tread edges" refer to the outermost points of the aforementioned tread surface on both sides in the tire width direction.

The "ground contact width" refers to the maximum width of the aforementioned contact patch.

The "circumferential main groove" refers to a groove extending in the tire circumferential direction and having an opening width of 2 mm or more at the aforementioned tread surface when the pneumatic tire is mounted on an applicable rim, filled to a prescribed internal pressure, and under no load.

The "widthwise groove" refers to a groove extending in the tire width direction and having an opening width of 2 mm or more at the aforementioned tread surface when the pneumatic tire is mounted on an applicable rim, filled to a prescribed internal pressure, and under no load.

The "widthwise sipe" refers to a sipe extending in the tire width direction and having an opening width of less than 2 mm at the aforementioned tread surface when the pneumatic tire is mounted on an applicable rim, filled to a prescribed internal pressure, and under no load.

The "first inclination angle" and "second inclination angle" refer to the angle, relative to the tire width direction, of a line segment connecting both tire widthwise end points of the widthwise sipe in the case in which the inclination angle varies in the tire width direction.

In the present specification, the "applicable rim" refers to a standard rim of an applicable size, such as the Measuring Rim in the STANDARDS MANUAL of the European Tyre and Rim Technological Organisation (ETRTO) in Europe or the Design Rim in the YEAR BOOK of the Tire and Rim Association, Inc. (TRA) in the USA, that is described, or will be described in the future, in industrial standards effective in the region where the tire is manufactured and used, such as the YEAR BOOK published by the Japan Automobile Tyre Manufacturers Association (JATMA) in Japan, the STANDARDS MANUAL of the ETRTO, and the YEAR BOOK of the TRA. (In other words, the "rim" encompasses not only current sizes but also sizes that may be included in industrial standards in the future. An example of the "size that will be described in the future" is the size described under "future developments" in the ETRTO Standards Manual 2013). In the case of a size not specified in the aforementioned industrial standards, the "rim" refers to a rim whose width corresponds to the bead width of the tire.

The "prescribed internal pressure" represents the air pressure (maximum air pressure) corresponding to the maximum load capability of a single wheel in an applicable size/ply rating described by the aforementioned JATMA or the like. In the case of a size not listed in the industrial standards, the "prescribed internal pressure" refers to the air pressure (maximum air pressure) corresponding to the maximum load capability prescribed for each vehicle on which the tire is mounted.

The "maximum load" refers to the load corresponding to the aforementioned maximum load capability.

Advantageous Effect

According to the present disclosure, a pneumatic tire that suppresses the generation of pattern noise and improves the drainage performance when wear progresses can be provided.

DETAILED DESCRIPTION

Embodiments of the present disclosure are described below in detail with reference to the drawings.

The internal structure and the like of the pneumatic tire (hereinafter referred to simply as the tire) can be the same as those of conventional tires. As an example, the tire can have a pair of bead portions, a pair of sidewall portions connected to the pair of bead portions, and a tread portion disposed between the pair of sidewall portions. The tire can also have a carcass extending toroidally between the pair of bead portions and a belt disposed on the radially outward side of a crown portion of the carcass.

Unless otherwise specified, the dimensions and the like refer to the dimensions and the like when the tire is mounted on an applicable rim, filled to the prescribed internal pressure, and under no load.

Figure 1:
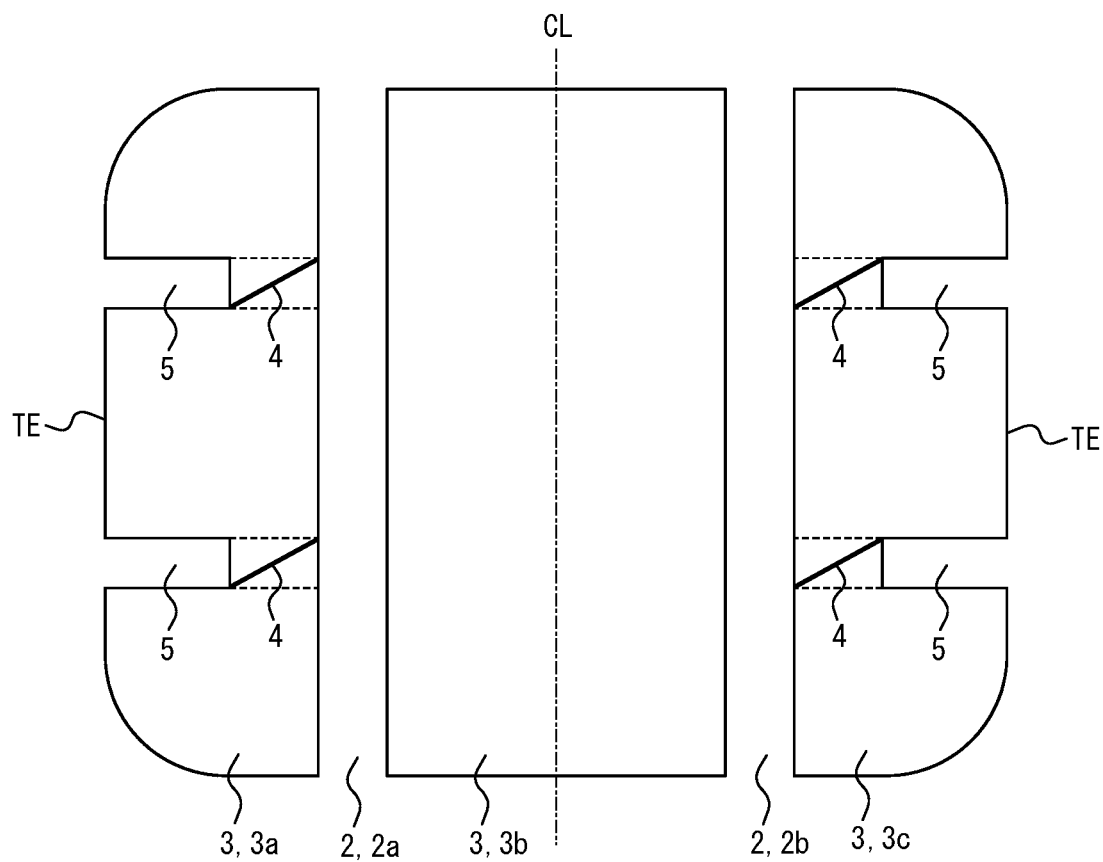
FIG. 1 is a developed view schematically illustrating a tread pattern of a pneumatic tire according to an embodiment of the present disclosure at the time the pneumatic tire is new.

FIG. 1 is a developed view schematically illustrating a tread pattern of a pneumatic tire according to an embodiment of the present disclosure at the time the pneumatic tire is new.

As illustrated in FIG. 1, a tire of the present example includes, on a tread surface 1, a plurality (two in the illustrated example) of circumferential main grooves 2 (2a, 2b) extending in the tire circumferential direction. In the example illustrated in FIG. 1, the number of circumferential main grooves 2 is two, but the number can be three or more. In the present example, a land portion 3b is located on the tire equatorial plane CL, but a configuration in which a circumferential main groove 2 is located on the tire equatorial plane CL may be adopted.

The groove width (opening width (opening width measured perpendicular to the extending direction of the groove in plan view)) of the circumferential main groove 2 is not particularly limited, since the groove width also depends on the number of circumferential main grooves 2, but can, for example, be between 3 mm and 15 mm. Similarly, the groove depth (maximum depth) of the circumferential main groove 2 is not particularly limited but can, for example, be between 14 mm and 20 mm.

In the illustrated example, the circumferential main grooves 2 all extend along the tire circumferential direction (without inclination) in plan view of the tread surface 1, but at least one of the circumferential main grooves 2 may extend at an inclination relative to the tire circumferential direction. In this case, the circumferential main groove 2 may extend while inclined at an angle of, for example, 5° or less relative to the tire circumferential direction. In the illustrated example, all of the circumferential main grooves 2 extend in a straight line in the tire circumferential direction, but at least one of the circumferential main grooves 2 may have a shape such as a zigzag shape or a curved shape.

As illustrated in FIG. 1, the tire includes, on the tread surface 1, a plurality (three in the illustrated example) of land portions 3 (3a, 3b, 3c) defined by circumferential main grooves 2 adjacent in the tire width direction among the plurality of circumferential main grooves 2, or by the circumferential main grooves 2 (2a, 2b) and the tread edges TE. In the present example, the two circumferential main grooves 2a, 2b are respectively positioned in one half and the other half, in the tire width direction, divided by the tire equatorial plane CL. The land portion 3b is located on the tire equatorial plane CL, and two land portions 3 (3a, 3c) are located in the half portions in the tire width direction.

In the present example, the widthwise outermost land portions (3a, 3c) defined by a tread edge and by a circumferential main groove located farthest outward in the tire width direction are rib-like land portions that are not completely divided in the tire circumferential direction by a widthwise groove alone, and the land portion 3b located on the tire equatorial plane CL does not include a widthwise groove and is thus a rib-like land portion. On the other hand, the land portions other than the widthwise outermost land portions are not limited to the case of being rib-like land portions and may instead be block-shaped land portions. As described below, the widthwise outermost land portions can become block-shaped when the widened portion of the widthwise sipe appears on the tread surface due to progression of wear.

Furthermore, a land portion is still considered a rib-like land portion in the case in which the land portion is completely divided in the tire circumferential direction by a widthwise sipe, or when the land portion is completely divided in the tire circumferential direction by a widthwise groove and a widthwise sipe, as in FIG. 1, for example.

In the example illustrated in FIG. 1, the land portion 3b located on the tire equatorial plane CL does not have any widthwise grooves, widthwise sipes, or circumferential sipes. However, widthwise grooves, widthwise sipes, and/or circumferential sipes (one or more of any one or more types) can be provided as appropriate in land portions other than the widthwise outermost land portions. The "circumferential sipe" refers to a sipe extending in the tire circumferential direction and having an opening width of less than 2 mm at the aforementioned tread surface when the pneumatic tire is mounted on an applicable rim, filled to a prescribed internal pressure, and under no load.

As illustrated in FIG. 1, this tire includes, in the widthwise outermost land portions (3a, 3c) defined by the tread edges TE and by the circumferential main grooves (2a, 2b) located farthest outward in the tire width direction, a plurality of widthwise grooves 5 extending from the tread edges TE inward in the tire width direction and a plurality of widthwise sipes 4 extending from the tire widthwise inner edge of the widthwise grooves 5 inward in the tire width direction and connecting to the circumferential main grooves 2. Two widthwise grooves 5 and two widthwise sipes 4 are provided in each widthwise outermost land portion (3a, 3c) in the illustrated range, but the number and pitch length of the widthwise grooves 5 and the widthwise sipes 4 can be set as needed.

Here, the groove width (opening width (opening width measured perpendicular to the extending direction of the groove in plan view)) of the widthwise groove 5 is not particularly limited, since the groove width also depends on the number of widthwise grooves 5, but can, for example, be between 5 mm and 10 mm. Similarly, the groove depth (maximum depth) of the widthwise groove 5 is not particularly limited, but can, for example, be between 14 mm and 20 mm. In the illustrated example, the widthwise grooves 5 all extend in a straight line.

The sipe width (opening width (opening width measured perpendicular to the extending direction of the sipe)) of the widthwise sipe 4 is not particularly limited, since the sipe width also depends on the number of widthwise sipes 4, but can, for example, be between 0.6 mm and 1.2 mm. Similarly, the sipe depth (maximum depth) of the widthwise sipe 4 is not particularly limited but can, for example, be between 14 mm and 20 mm. In the illustrated example, the widthwise sipes 4 all extend in a straight line.

In the illustrated example, the widthwise grooves 5 extend in the tire width direction in the widthwise outermost land portions 3a, 3c, but the widthwise grooves 5 may extend at an inclination relative to the tire width direction. In the case in which the widthwise grooves 5 extend at an inclination relative to the tire width direction, the widthwise grooves 5 preferably extend while inclined relative to the tire width direction at an inclination angle of 45° or less, and preferably extend while inclined at an inclination angle of 30° or less. The inclination angles (including 0°) of the widthwise grooves 5 relative to the tire width direction can differ between land portions 3. The inclination angles (including 0°) of the widthwise grooves 5 relative to the tire width direction can also differ within a land portion 3. In the illustrated example, all of the widthwise grooves 5 extend in a straight line in the tire width direction, but at least one of the widthwise grooves 5 may have a bent portion.

Figure 2:
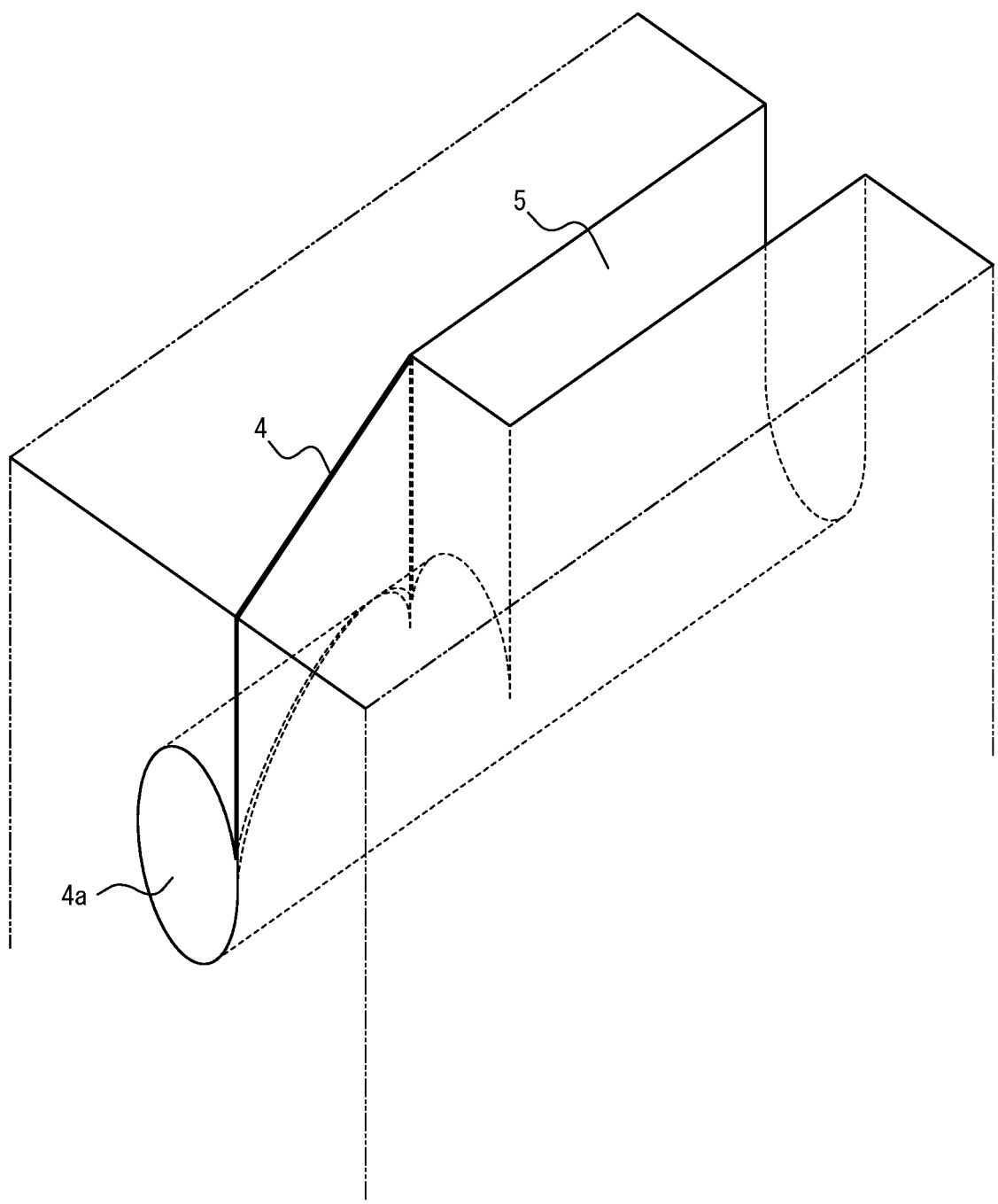
FIG. 2 is a transparent perspective view illustrating a widthwise groove and a widthwise sipe.
Figure 3A:
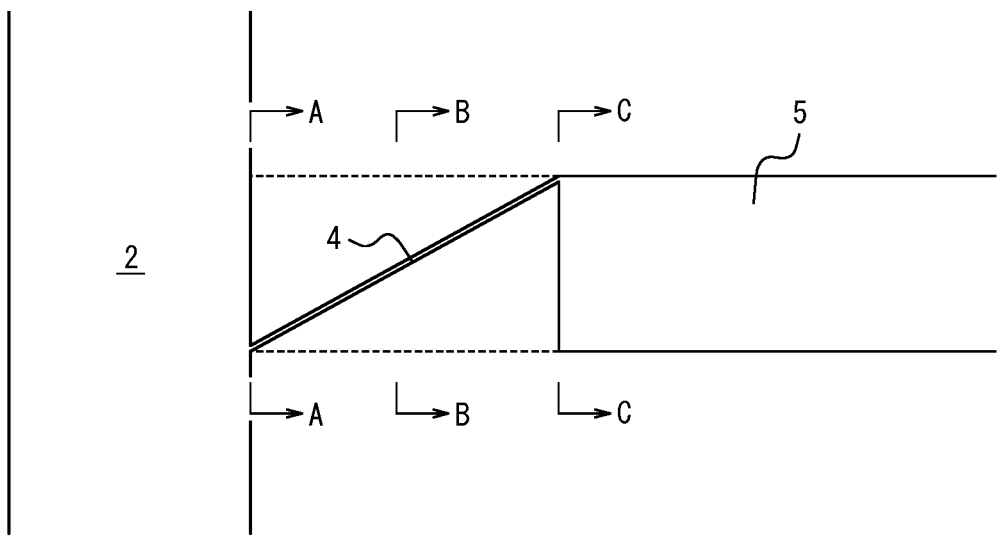
FIG. 3A is a plan view illustrating an enlargement of the circumferential main groove, the widthwise groove, and the widthwise sipe in FIG. 1.
Figure 3B:
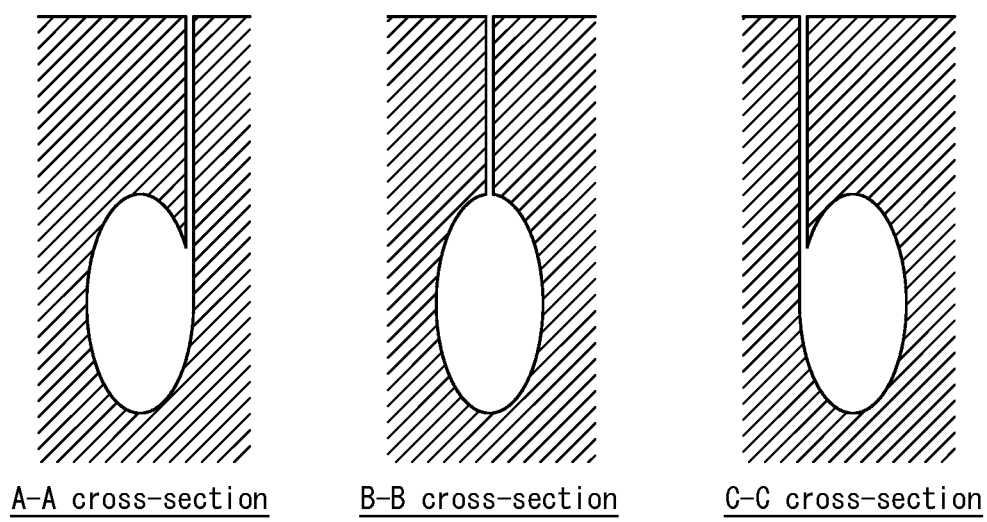
FIG. 3B is a diagram illustrating an A-A cross-section, a B-B cross-section, and a C-C cross-section of FIG. 3A.

FIG. 2 is a transparent perspective view illustrating a widthwise groove and a widthwise sipe. FIG. 3A is a plan view illustrating an enlargement of the circumferential main groove, the widthwise groove, and the widthwise sipe in FIG. 1. FIG. 3B is a diagram illustrating an A-A cross-section, a B-B cross-section, and a C-C cross-section of FIG. 3A.

As illustrated in FIG. 2, the widthwise sipe 4 has a widened portion 4a on the sipe bottom side, at which the sipe width is larger than on the tread surface 1 side. As illustrated in FIG. 2, in the present example, the widthwise sipe 4 is formed by the widened portion 4a, located in a region that is inward in the tire radial direction and includes the sipe bottom, and a flat sipe portion, on the tread surface 1 side, located outward in the tire radial direction from the widened portion 4a and having a different extending direction than the widened portion 4a. As illustrated in FIGS. 3A, 3B, in the present example, the flat sipe portion is located in the tire circumferential center of the widened portion 4a in the B-B cross-section of FIG. 3A but is located on one side and on the other side respectively in the tire circumferential direction relative to the flat sipe portion in the A-A and C-C cross-sections of FIG. 3A.

The sipe width (maximum width) of the widened portion 4a is not particularly limited but is preferably 2 to 10 times the opening width of the widthwise sipe 4 at the tread surface 1. In the present example, the widened portion 4a has an elliptical shape in a cross-section orthogonal to the extending direction of the widthwise sipe 4 (in the illustrated example, the major axis lies along the tire radial direction) but can instead have various other shapes, including a circular shape, a polygonal shape such as a rectangular shape, or an elliptical shape with a different major axis direction than in FIG. 2. However, from the perspective of improving the drainage performance as wear progresses, the cross-sectional shape more preferably includes a point where the sipe width increases from the outside to the inside in the tire radial direction.

The extension length of the widened portion 4a in the depth direction of the sipe is not particularly limited but can be 20% to 50% of the depth of the widthwise sipe 4.

The widened portion 4a includes the sipe bottom in the illustrated example, but the sipe bottom can be configured as a portion with a constant sipe width (such as a flat portion), and the widened portion can be provided on the tire radial outer side of this portion.

Here, as illustrated in FIGS. 1 and 3A, the widthwise sipes 4 extend while inclined at a first inclination angle relative to the tire width direction in plan view of the tread surface 1 (at the time the tire is new). The first inclination angle is preferably between 20° and 45°, more preferably between 25° and 40°.

As illustrated in FIG. 2, in the tire radial region where the widened portion 4a is located, the widened portion 4a extends while inclined at a second inclination angle smaller than the first inclination angle relative to the tire width direction, or includes a portion extending along the tire width direction. In the illustrated example, the widened portion 4a extends along the tire width direction in the entire tire radial region where the widened portion 4a is located. In the case of extension at the second inclination angle, the second inclination angle is preferably 15° or less, more preferably 10° or less (but is smaller than the first inclination angle). As described above, no lower limit is particularly set on the inclination angle, since the widened portion 4a preferably extends along the tire width direction.

The inclination angles (first inclination angle and/or second inclination angle) of a plurality of widthwise sipes 4 relative to the tire width direction can be the same or different between land portions 3. The inclination angles (first inclination angle and/or second inclination angle) of a plurality of widthwise sipes 4 relative to the tire width direction can also be the same or different within a land portion 3.

Figure 5:
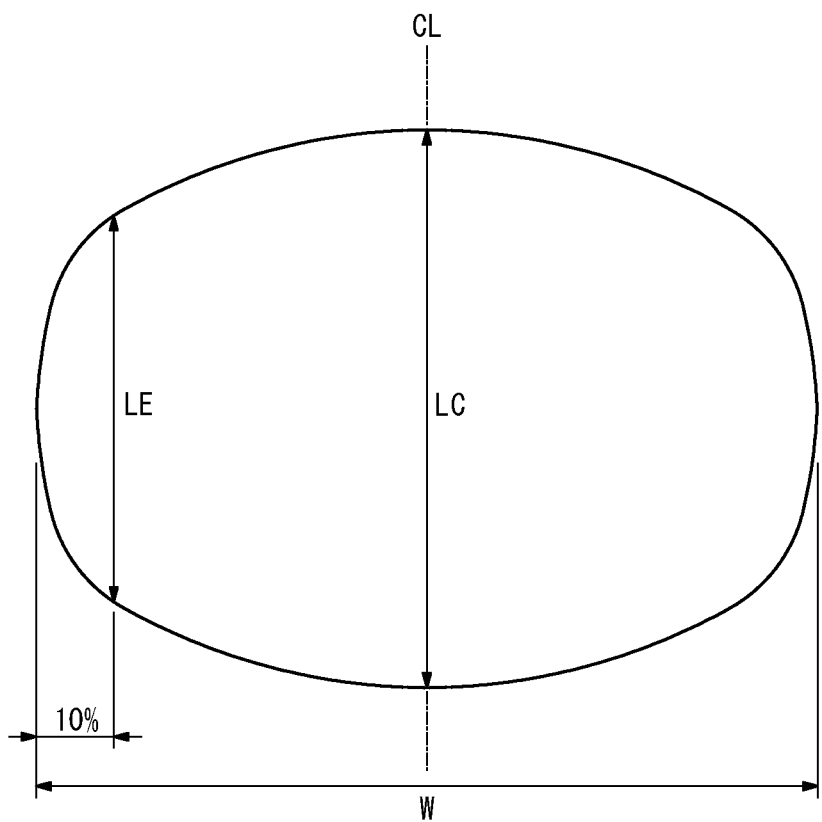
FIG. 5 is a diagram illustrating the rectangle ratio.

FIG. 5 is a diagram illustrating the rectangle ratio. In the contact patch when the pneumatic tire is mounted on an applicable rim, filled to the prescribed internal pressure, and subjected to the maximum load, a rectangle ratio (see FIG. 5) of the ground contact length LE at a position, in the tire width direction, located 10% of the ground contact width W inward in the tire width direction from the tire widthwise edge to the ground contact length LC at the center of the contact patch in the tire width direction is 0.8 or more in this tire (at the time the tire is new).

Figure 4:
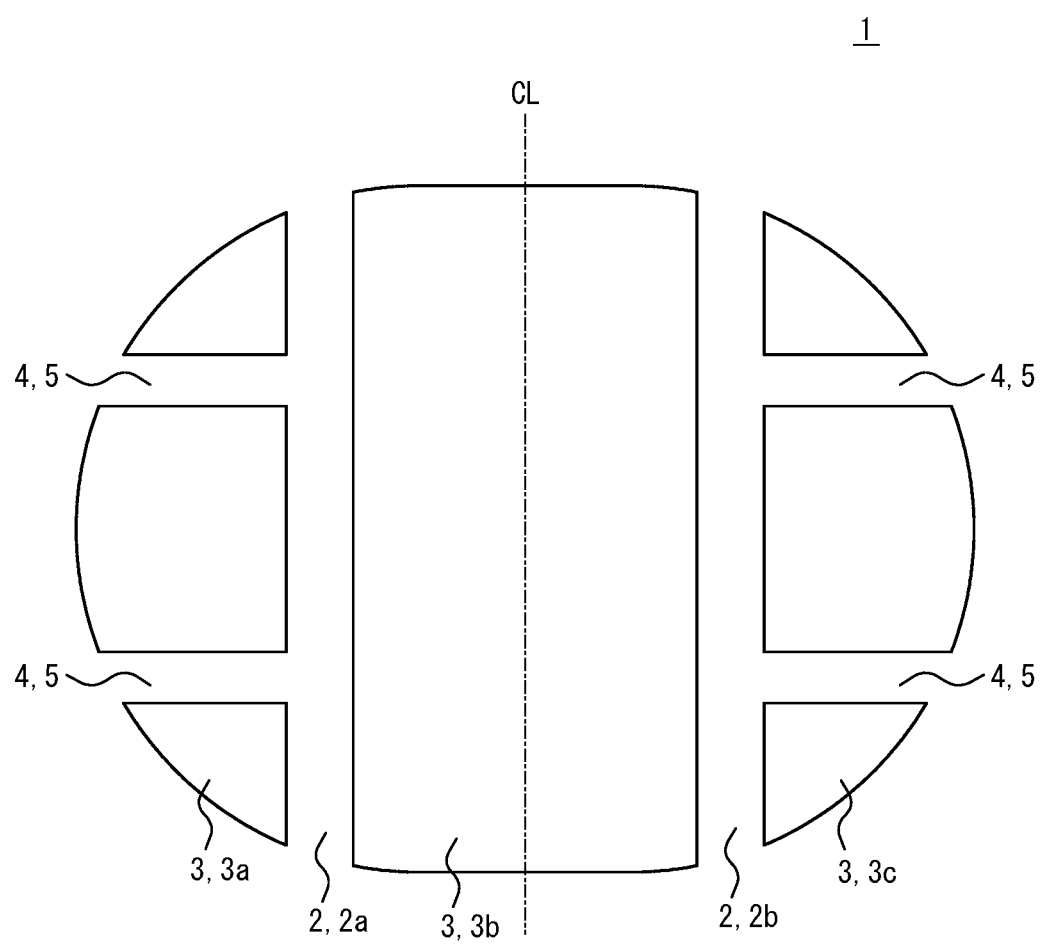
FIG. 4 is a developed view schematically illustrating a tread pattern of a pneumatic tire according to an embodiment of the present disclosure when wear has progressed.

FIG. 4 is a developed view schematically illustrating a tread pattern of a pneumatic tire according to an embodiment of the present disclosure at the time wear has progressed. As illustrated in FIG. 4, a tire with a high rectangle ratio (0.8 or higher) tends to experience shoulder wear (greater wear in the shoulder portion than in the central portion) under normal use (especially noticeable during use as a front wheel of a rear-wheel drive vehicle or a rear wheel of a front-wheel drive vehicle).

The effects of the pneumatic tire according to the present embodiment are described below.

According to the pneumatic tire of the present embodiment, the drainage performance can be improved, since a plurality of widthwise grooves 5 and widthwise sipes 4 is provided in the widthwise outermost land portions 3a, 3c. Furthermore, since the widthwise sipes 4 include the aforementioned widened portion 4a, the drainage performance can also be secured when wear progresses.

As a result of the rectangle ratio of the pneumatic tire of the present embodiment being 0.8 or more, the shoulder portion wears much more than the central portion as wear progresses, and the outline shape of the widthwise outermost land portions on the stepping-in side of the contact patch becomes round in plan view, as illustrated in FIG. 4.

Therefore, in the present embodiment, the widthwise sipes 4 extend while inclined at the first inclination angle relative to the tire width direction in plan view of the tread surface 1 (when the tire is new), whereas in the tire radial region where the widened portion 4a is located, the widened portion 4a (which appears as the contact patch when wear has progressed) extends while inclined at the second inclination angle smaller than the first inclination angle relative to the tire width direction, or includes a portion extending along the tire width direction (in the illustrated example, the widened portion 4a extends along the tire width direction in the entire tire radial region where the widened portion 4a is located).

As a result, when the tire is new, the outline on the stepping-in side of the contact patch, which extends relatively along the tire width direction, and the widthwise sipes, which extend while inclined at the first inclination angle relative to the tire width direction, differ in their inclination relative to the tire width direction, thereby suppressing the generation of pattern noise. Furthermore, when wear has progressed (when the aforementioned tire radial region that extends while inclined at the second inclination angle, smaller than the first inclination angle, relative to the tire width direction, or which includes a portion extending along the tire width direction, is exposed on the tread surface), the outline on the stepping-in side of the contact patch, which is relatively inclined with respect to the tire width direction, and the widened portion 4a, which extends while inclined at the second inclination angle, smaller than the first inclination angle, relative to the tire width direction (along the tire width direction in the present example), differ in their inclination relative to the tire width direction, thereby suppressing the generation of pattern noise. In this way, the generation of pattern noise can be suppressed from the time the tire is new through the time wear has progressed.

As described above, according to the pneumatic tire of the present embodiment, the drainage performance when wear progresses can be improved while the generation of pattern noise is suppressed.

In particular in the present embodiment, since the widened portion 4a extends along the tire width direction in the entire tire radial region where the widened portion 4a is located, the aforementioned effects can be obtained in the entire tire radial region.

In the present example, the aforementioned effects can be obtained in the widthwise outermost land portions 3a, 3c on both sides in the tire width direction, but if the configuration described in the present embodiment is adopted in one of the widthwise outermost land portions, the effects of the present disclosure can be obtained in that widthwise outermost land portion.

The aforementioned rectangle ratio is preferably 0.85 or more, more preferably 0.9 or more. This is because when the tire is new, the outline on the stepping-in side of the contact patch is more aligned with the tire width direction, so that the difference in inclination, relative to the tire width direction, from the widthwise sipes that have the aforementioned first inclination angle is greater, and the generation of pattern noise can be further suppressed. Additionally, as the rectangle ratio is larger, shoulder wear has a greater tendency to occur, and the outline on the stepping-in side of the contact patch becomes inclined relative to the tire width direction when wear progresses. This increases the difference in inclination, relative to the tire width direction, from the widthwise sipes that have the aforementioned second inclination angle or that include the widened portion of the widthwise sipe along the tire width direction, thereby further suppressing the generation of pattern noise.

As described above, the first inclination angle is preferably between 20° and 45°. By the first inclination angle being set to 20° or more, the difference in inclination, relative to the tire width direction, between the widthwise sipes and the outline on the stepping-in side of the contact patch becomes larger when the tire is new, thereby further suppressing the generation of pattern noise. On the other hand, by the first inclination angle being set to 45° or less, the traction performance in the tire circumferential direction can be improved. For the same reasons, the first inclination angle is more preferably between 25° and 40°.

As described above, the second inclination angle is preferably 15° or less. This is because by the second inclination angle being set to 15° or less, the difference in inclination, relative to the tire width direction, between the widthwise sipes and the outline on the stepping-in side of the contact patch becomes larger when wear has progressed, thereby further suppressing the generation of pattern noise. For the same reasons, the second inclination angle is more preferably 10° or less. As described above, no lower limit is particularly set on the second inclination angle, since the widened portion preferably extends along the tire width direction.

Here, the widened portion extends while inclined at the aforementioned second inclination angle, which is smaller than the aforementioned first inclination angle, relative to the tire width direction or extends along the tire width direction, as in the above embodiment, preferably over 50% or more, more preferably 80% or more, and even more preferably all, of the region in the tire radial direction where the aforementioned widened portion is located. This is because the aforementioned effect of suppressing the generation of pattern noise can thus be obtained over 50% or more, more preferably 80% or more, and even more preferably all, of the region in the tire radial direction where the widened portion is located. This also facilitates the manufacturing of the widthwise sipes that have the widened portion.

Alternatively, the inclination angle of the widened portion relative to the tire width direction preferably decreases gradually (including the case of reaching 0°) from the outside to the inside in the tire radial direction over 50% or more, more preferably 80% or more, and even more preferably all, of the region in the tire radial direction where the aforementioned widened portion is located. With this configuration as well, the aforementioned effect of suppressing the generation of pattern noise can be obtained over 50% or more, more preferably 80% or more, and even more preferably all, of the region in the tire radial direction where the widened portion is located. Since the inclination angle changes gradually as wear progresses, this configuration can also suppress sudden changes in tire performance when wear progresses.

The widened portion preferably has a circular or elliptical shape in a cross-section orthogonal to the extending direction of the widthwise sipe. This shape improves the mold release when the widthwise sipes are manufactured.

Non-limiting examples of how to manufacture the widthwise sipes with the aforementioned widened portion include using a blade with a corresponding shape, and using a 3D printer.

While embodiments of the present disclosure have been described above, the present disclosure is in no way limited to the above embodiments. For example, in the above embodiment, the widened portion extends in a straight line, but the second inclination angle can also vary along the extending direction of the widened portion. In this case, the widened portion preferably extends at the aforementioned second inclination angle over 80% or more, preferably all, of the extending direction of the widened portion from the perspective of obtaining the effect of suppressing the generation of pattern noise.

REFERENCE SIGNS LIST

1 Tread surface
2, 2a, 2b Circumferential main groove
3, 3a, 3b, 3c Land portion
4 Widthwise sipe
4a Widened portion
5 Widthwise groove
CL Tire equatorial plane
TE Tread edge

The invention claimed is:

1. A pneumatic tire comprising a plurality of circumferential main grooves extending in a tire circumferential direction on a tread surface; and
   in a widthwise outermost land portion defined by a tread edge and by the circumferential main groove located farthest outward in a tire width direction, a plurality of widthwise grooves extending from the tread edge inward in the tire width direction and a plurality of widthwise sipes extending from a tire widthwise inner edge of the widthwise grooves inward in the tire width direction and connecting to the circumferential main groove, wherein
   each widthwise sipe includes a widened portion, on a sipe bottom side, at which a sipe width is larger than on the tread surface side,
   in a contact patch when the pneumatic tire is mounted on an applicable rim, filled to a prescribed internal pressure, and subjected to a maximum load, a rectangle ratio of a ground contact length LE at a position, in the tire width direction, located 10% of a ground contact width W inward in the tire width direction from a tire widthwise edge to a ground contact length LC at a center of the contact patch in the tire width direction is 0.8 or more,
   each widthwise sipe extends while inclined at a first inclination angle relative to the tire width direction in plan view of the tread surface,
   in a tire radial region in which the widened portion is located, the widened portion extends while inclined at a second inclination angle smaller than the first inclination angle relative to the tire width direction, or includes a portion extending along the tire width direction, and
   across an entire tire radial region in which the widened portion is located, an inclination angle of the widened portion relative to the tire width direction decreases gradually from outside to inside in a tire radial direction.

2. The pneumatic tire of claim 1, wherein the rectangle ratio is 0.85 or more.

3. The pneumatic tire of claim 2, wherein the rectangle ratio is 0.9 or more.

4. The pneumatic tire of claim 1, wherein the first inclination angle is from 20° to 45°.

5. The pneumatic tire of claim 1, wherein the second inclination angle is 15° or less.

6. The pneumatic tire of claim 1, wherein across an entire tire radial region in which the widened portion is located, the widened portion extends while inclined at a second inclination angle smaller than the first inclination angle relative to the tire width direction, or extends along the tire width direction.

7. The pneumatic tire of claim 1, wherein the widened portion has a circular shape or an elliptical shape in a cross-section orthogonal to an extending direction of the widthwise sipe.

8. The pneumatic tire of claim 2, wherein the first inclination angle is from 20° to 45°.

9. The pneumatic tire of claim 3, wherein the first inclination angle is from 20° to 45°.

10. The pneumatic tire of claim 2, wherein the second inclination angle is 15° or less.

11. The pneumatic tire of claim 3, wherein the second inclination angle is 15° or less.

12. The pneumatic tire of claim 4, wherein the second inclination angle is 15° or less.

13. The pneumatic tire of claim 2, wherein across an entire tire radial region in which the widened portion is located, the widened portion extends while inclined at a second inclination angle smaller than the first inclination angle relative to the tire width direction, or extends along the tire width direction.

14. The pneumatic tire of claim 3, wherein across an entire tire radial region in which the widened portion is located, the widened portion extends while inclined at a second inclination angle smaller than the first inclination angle relative to the tire width direction, or extends along the tire width direction.

15. The pneumatic tire of claim 4, wherein across an entire tire radial region in which the widened portion is located, the widened portion extends while inclined at a second inclination angle smaller than the first inclination angle relative to the tire width direction, or extends along the tire width direction.

16. The pneumatic tire of claim 5, wherein across an entire tire radial region in which the widened portion is located, the widened portion extends while inclined at a second inclination angle smaller than the first inclination angle relative to the tire width direction, or extends along the tire width direction.

* * * * *